United States Patent [19]
Niedrach

[11] 3,898,147
[45] Aug. 5, 1975

[54] BICARBONATE ION ELECTRODE AND SENSOR

[75] Inventor: Leonard W. Niedrach, Schenectady, N.Y.

[73] Assignee: General Electric Company, Schenectady, N.Y.

[22] Filed: Aug. 2, 1974

[21] Appl. No.: 493,864

[52] U.S. Cl............. 204/195 M; 128/2 E; 204/1 T
[51] Int. Cl...................... G01n 27/30; G01n 27/46
[58] Field of Search............ 204/195 M, 195 P, 1 T; 128/2 E; 324/29

[56] References Cited
UNITED STATES PATENTS

| | | | |
|---|---|---|---|
| 3,357,908 | 12/1967 | Riseman et al................. | 204/195 P |
| 3,719,575 | 3/1973 | Niedrach et al................ | 204/195 P |
| 3,719,576 | 3/1973 | Macur.......................... | 204/195 P |
| 3,723,281 | 3/1973 | Wise............................ | 204/195 L |
| 3,730,868 | 5/1973 | Niedrach...................... | 204/195 P |
| 3,767,553 | 10/1973 | Brown et al................... | 204/195 M |
| 3,811,184 | 5/1974 | Niedrach et al................ | 204/1 T X |

Primary Examiner—G. L. Kaplan
Attorney, Agent, or Firm—Paul R. Webb, II.; Joseph T. Cohen; Jerome C. Squillaro

[57] ABSTRACT

A bicarbonate ion electrode is described which has an electrode lead, an electrochemically active region of silver and a silver halide other than a fluoride at one end thereof, an electrolyte containing at least the bicarbonate ion to be detected and an ion which enters into electrochemical equilibrium with the active region of the lead in contact with the active region, a hydrogen ion permeable membrane encapsulating the active region and the electrolyte, and electrical insulation covering the remaining portion of the electrode lead. When the potential of the electrode is measured with respect to that of an external reference electrode, a bicarbonate ion sensor is provided.

5 Claims, 1 Drawing Figure

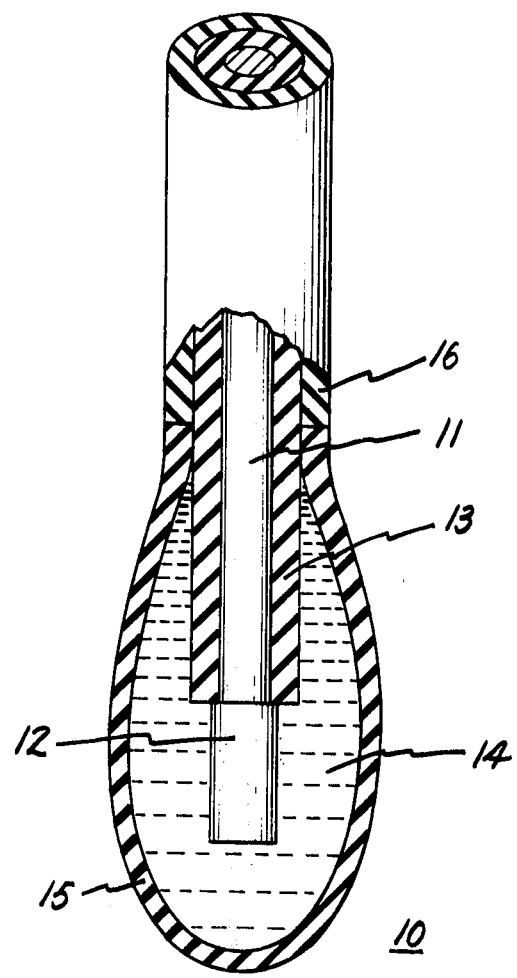

BICARBONATE ION ELECTRODE AND SENSOR

This invention relates to a bicarbonate ion electrode and sensor and, more particularly, to such a bicarbonate ion electrode and sensor for in vivo or in vitro analysis.

Electrodes are employed in sensors to determine the content of a specific substance in a fluid or atmosphere. For example, a sensor might be employed to determine the content of carbon dioxide in a sample, or its content of hydrogen ions or other ions in solution.

Both pH and carbon dioxide sensors are known, respectively, in the prior art for measuring the hydrogen ion activity or pH of a sample, or for measuring the carbon dioxide content of a sample. A hydrogen ion or pH sensor is described and claimed in U.S. Pat. Nos. 3,671,414, 3,709,810 and 3,719,576. Carbon dioxide sensors are described in U.S. Pat. Nos. 3,673,069, 3,705,088, 3,709,812 and 3,719,576. Methods of manufacturing sensors by successive layers are described in U.S. Pat. No. 3,798,750. All of the above patents are assigned to the same assignee as the present application.

My present invention is directed to an improved bicarbonate ion electrode and sensor which is suitable for biomedical, environmental control and other applications.

The primary objectives of my invention is to provide a rugged electrode and sensor for accurate measurement of bicarbonate ions.

In accordance with one aspect of my invention, a bicarbonate electrode contains a silver and silver halide electrochemically active region at one end of an electrode lead which active region is coated with an electrolyte containing at least the bicarbonate ion to be detected and an ion which enters into electrochemical equilibrium with the active region of the lead and encapsulated within a hydrogen ion permeable membrane.

These and various other objectives, features and advantages of the invention will be better understood from the following description taken in connection with the accompanying drawing in which:

The single FIGURE is a partial sectional view of a bicarbonate ion electrode made in accordance with my invention.

In the single FIGURE of the drawing there is shown generally at 10 a bicarbonate ion electrode made in accordance with my invention. The bicarbonate ion electrode is shown in the form of flexible, elongated electrode lead 11 which has a metallic base member, such as a silver wire. An electrochemically active region 12 adheres tightly to and is in electrical contact with one end of the metallic base member 11. Electrochemically active region 12 is silver and a silver halide other than a fluoride. A layer 13 of electrical insulation is disposed on the surface of the metallic base member. An electrolyte 14, which is preferably aqueous and immobilized, contacts electrochemically active region 12. An outer sheath 15 of a hydrogen ion permeable membrane encapsulates the electrochemically active region 12 and electrolyte 14. Additional electrical insulation 16 is shown covering remainder of metallic lead 11 and forms a tight joint with sheath 15.

With the above arrangement the chlorided silver electrode would be poised at a fixed potential. The pH of the dilute buffer solution in the sensor would change proportionally to the $P_{CO_2}$ in equilibrium with the bicarbonate containing solution being measured. This would be reflected by an associated change in the potential of the inner surface of the pH sensitive polymer membrane. The potential of the external surface of the membrane would respond to the pH of the bicarbonate solution being measured. The output voltage from such a sensor and a suitable reference electrode would then be given by $$E = E' - E_{ref.} - \frac{RT}{R} \log P_{CO_2} + \frac{RT}{F} \log [H^+].$$

where $E'$ is the potential of the silver-silver chloride electrode as determined by the saline concentration incorporated into the sensor, and the other terms have their usual meanings.

Both the hydrogen ion concentration and the carbon dioxide pressure are related to the bicarbonate concentration of a solution by so that
$$K = [H^+][HCO_3^-]/K_s P_{CO_2}$$
$$E = E' - E_{ref.} + \frac{RT}{F} \log KK_s - \frac{RT}{F} \log [HCO_3^-]$$
or
$$E = E' - \frac{RT}{F} \log [HCO_3^-]$$

Thus, I have a bicarbonate ion sensor.

I have found that I could form the above improved electrode by a method of applying successive or alternate elements or layers by immersing or dipping the initial metal surfaced member in various aqueous and organic solutions. The application of the successive layers is preferably accomplished by such immersion steps but other suitable means include coating, spraying, brushing, etc. The use of immersion steps is described and claimed in the above referenced U.S. Pat. No. 3,798,750.

The electrode of my invention can be formed by employing for the initial electrode lead or support wire a silver wire. The electrochemically active region 12 is silver and a silver halide other than a fluoride. The remaining portion of the lead except for the electrochemically active portion and for a short length at the opposite end is insulated with suitable electrical insulation, for example, epoxy resins, polymides, polyethers, poly(tetrafluoroethylene), silicone rubber or poly(dimethylsiloxane)-poly(bisphenol-A carbonate) block copolymers, or multiple coats of such insulations in order to provide improved bonding, for example, by a first coat of poly(tetrafluoroethylene) followed by a second coat of a poly(dimethylsiloxane)poly(bisphenol-A carbonate) block copolymer. The poly(tetrafluoroethylene) can be in tube form. The electrolyte must contain at least the bicarbonate ion to be detected and an ion which enters into electrochemical equilibrium with the active region of the lead. Specific hydrogen ion permeable material is required as an outer sheath to encapsulate active region and the electrolyte. The remainder of the sensor may be coated with a second layer of electrical insulation as discussed above. The specific permeable material has an appropriate permeability coefficient for carbon dioxide and hydrogen ion species which are to be sensed. The outer sheath is a membrane made in accordance with U.S. Pat. No. 3,743,588 which is assigned to the same assignee as the present application. This patent and its subject matter are incorporated by reference herein.

With reference to the single FIGURE of the drawing, an electrode is formed in accordance with my invention by employing as the electrode lead a 15 mil of silver wire 11, the base or support, upon which the successive elements are applied. The central portion of the wire except for about a 1 cm at each end had a first layer of electrical insulation 13 applied thereto. This insulation was in the form of a tube of poly(tetrafluoroethylene) insulation which was to be applied over the central portion of the electrode lead by slipping the tube over the lead. An additional coating of electrical insulation of a silicone-polycarbonate block copolymer as described in U.S. Pat. No. 3,189,622 was applied over the poly(tetrafluoroethylene) tube. In addition to its insulating properties, the copolymer provides improved adhesion for the subsequent abutting or overlapping outer sheath. An electrochemically active region 12 of silver and a silver halide other than a fluoride is formed in electrical contact with wire 11 by chloriding by anodization for 5 minutes at 0.6 ma in a 0.1 M sodium chloride solution. The opposite exposed end (not shown) is provided for subsequently applying an electrical lead thereto. The lower end of the structure with electrochemically active region 12 is coated with an electrolyte containing 0.065 M sodium bicarbonate and 0.08 M sodium chloride with a 3 percent Methocel gelling agent thereby forming an electrolyte 14. Such gelling agent is methylcellulose sold by Dow Chemical Company, Midland, Michigan. Electrolyte 14 is in contact with active region 12. An outer sheath 15 of a hydrogen ion permeable material of a hydrophobic elastomer-polymer with a dielectric constant of from 4 to 13, and a specific ion carrier such as described in U.S. Pat. No. 3,743,588 is then applied encapsulating the electrically active region 12 and electrolyte 14. The pH-sensing electrode is used with a second separate reference electrode such as a silver-silver halide electrode which is immersed in the same sample medium to provide a bicarbonate ion sensor.

The electrolyte is an aqueous solution, or an aqueous immobilized solution. A suitable aqueous electrolyte is 0.065 molar bicarbonate and 0.08 molar sodium chloride. The aqueous electrolyte can be immobilized, for example, with a conventional thickening or gelling agent. Such aqueous electrolytes and applications are described in above-mentioned U.S. Pat. No. 3,719,576. This patent and its subject matter are hereby incorporated by reference.

The resulting device is a bicarbonate ion sensor. The sensor comprising the bicarbonate ion electrode and an external reference electrode can be used for clinical and other analysis. A high impedance electrometer is connected to the bicarbonate ion electrode and to the reference electrode. In this manner the terminal voltage can be read across the electrodes. This terminal voltage from the electrode leads in operation of the sensor will be a function of bicarbonate ion content.

Examples of bicarbonate ion electrodes and sensors made in accordance with my invention are as follows:

EXAMPLE 1

A bicarbonate electrode was formed in accordance with the above description and as generally shown in the single FIGURE of the drawing. The electrode lead was in the form of a 15 mil silver wire.

The central portion of the wire or lead, with the exception of about 1 centimeter at each opposite end, had a poly(tetrafluoroethylene) tube slipped over the lead. An additional layer of insulation of a silicone-polycarbonate block copolymer as described in U.S. Pat. No. 3,189,622 was applied over the poly(tetrafluoroethylene) tube. An active region of silver and a silver halide other than a fluoride was provided at one end of the silver tube by chloriding by anodization for 5 minutes at 0.6 ma in a 0.1 M sodium chloride solution.

The lower end of the structure with the electrochemically active region of silver and silver chloride was coated with an aqueous immobilized electrolyte of 0.065 molar sodium bicarbonate and 0.08 molar sodium chloride with a 3 percent thickening agent forming an electrolyte contacting the active region. An outer sheath of a hydrogen ion permeable material was then applied over the electrolyte by dipping the structure wire in a solution of a poly(siloxane)poly-(bisphenol-A carbonate) block copolymer containing one percent p-octadecyloxy-m-chlorophenylhydrazone mesoxalonitrile in ethylene dichloride. The ethylene dichloride was removed by evaporation at ambient temperature. The outer sheath overlapped the second insulation. The resulting device was a bicarbonate ion electrode made in accordance with my invention.

EXAMPLE 2

The bicarbonate ion electrode formed in Example 1 was tested as follows:

After fabrication the electrode of Example 1 was employed in conjunction with a commercial silver chloride reference electrode and a pH meter to demonstrate its response to bicarbonate ion concentration in the presence of varying atmospheres of carbon dioxide in air. The electrode in combination with the silver chloride reference gave the following data upon immersion in two different saline-sodium bicarbonate solutions equilibrated with 10.08 percent carbon dioxide in air:

| $NaHCO_3$ conc. | NaCl conc. | mv vs ref. | Response mv decade [$HCO_3^-$] |
|---|---|---|---|
| 0.016 M | 0.134 M | 124.3 | 55.7 |
| 0.016 | 0.150 | 180.0 | |

The response of 55.7 mv/decade change in the bicarbonate ion concentration is in good agreement with the theoretical response of 59.2 mv at 25°C. Now if the potential of the measuring system is truly a reflection of the bicarbonate ion concentration one should be able to use the above data to procide a valid calibration for the use of the system under different conditions. Thus, the following should apply:

$$\log [HCO_3^-] = -(E - 124.3 - 55.7 \log 0.016)/55.7$$

independent of the carbon dioxide level in equilibrium with the solution. Using this relationship and voltage measurements made for two different bicarbonate solutions in equilibrium with 2.66 percent $CO_2$ in air the following results were obtained:

| E in mv | calc. [HCO$_3^-$] | actual [HCO$_3^-$] |
|---------|-------------------|--------------------|
| 122.8   | 0.017 M           | 0.016 M            |
| 177.2   | 0.0018 M          | 0.0016 M           | which is quite satisfactory agreement.

While other modifications of the invention and variations thereof which may be embraced within the scope of the invention have not been described, the invention is intended to include such as may be embraced within the following claims.

What I claim as new and desire to secure by Letters Patent of the United States is:

1. A bicarbonate ion electrode comprises a flexible, elongated electrode lead, an electrochemically active region showing electrochemical response to bicarbonate ion changes adhering tightly to and in electrical contact with one end portion of the electrode lead, electrical insulation surround the electrode lead, an electrolyte containing at least the bicarbonate ion to be detected and an ion which enters into electrochemical equilibrium with the active region of the lead contacting the electrochemically active region, and an outer sheath of a hydrogen ion permeable membrane encapsulating the electrochemically active region and the electrolyte, the hydrogen ion permeable membrane being a hydrophobic elastomer with a dielectric constant of from 4 to 13 and containing a hydrophobic and lipophilic H$^+$ ion carrier.

2. A bicarbonate ion electrode as in claim 1, in which the electrochemically active region showing a response to bicarbonate changes is silver and a silver halide other than a fluoride.

3. A bicarbonate ion electrode as in claim 1, in which the electrolyte is an immobilized aqueous solution.

4. A bicarbonate ion electrode as in claim 1, in which the hydrophobic and lipophilic H$^+$ ion carrier is p-octadecyloxy-m-chlorophenylhydrazone mesoxalonitrile.

5. A system for sensing bicarbonate ion comprising a reference electrode, the electrode of claim 1 and means connected to said electrodes for sensing a potential therebetween.

* * * * *